May 13, 1952   O. D. LUTES   2,596,574
PLOW COLTER
Filed March 3, 1948   2 SHEETS—SHEET 1
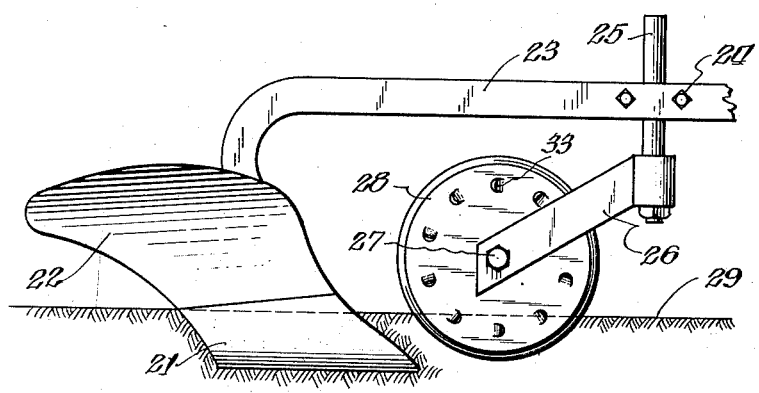
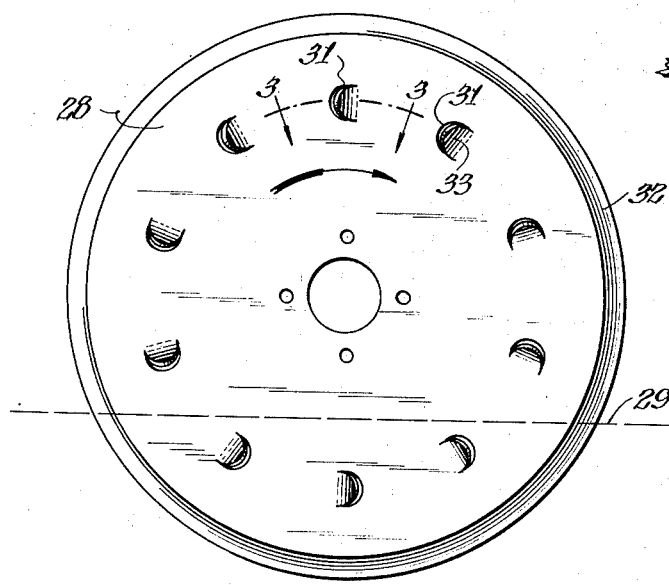
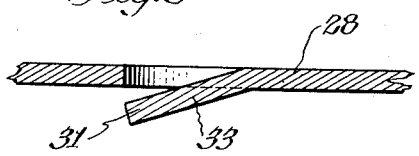
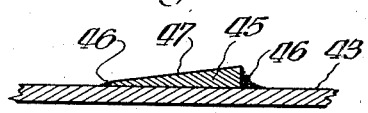
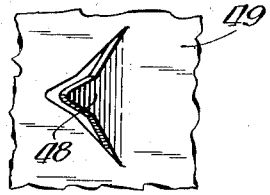
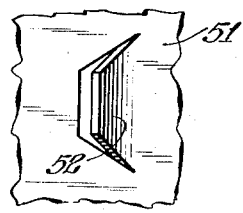
Inventor:
Oakley D. Lutes.
By: Alois W. Graf
Attorney.

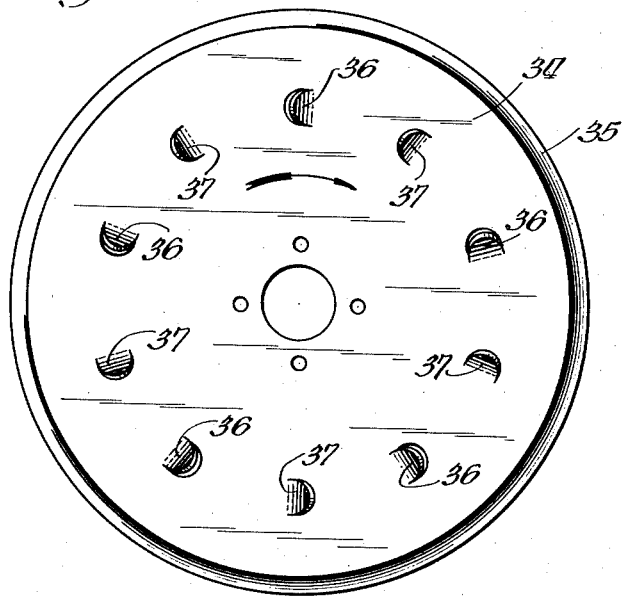
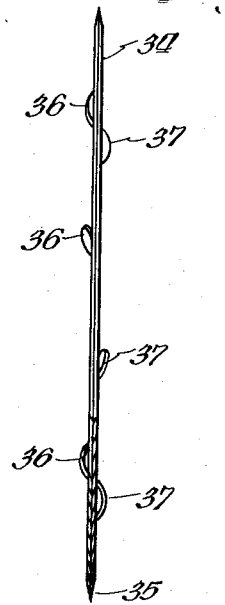
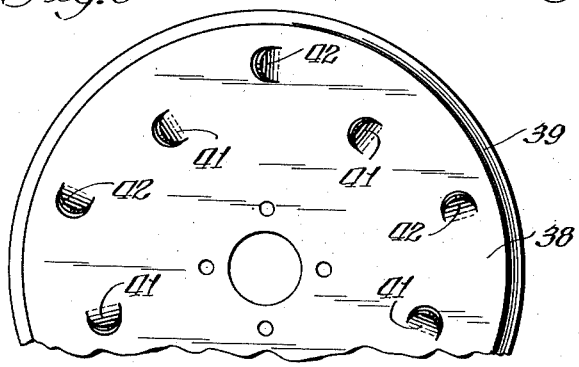
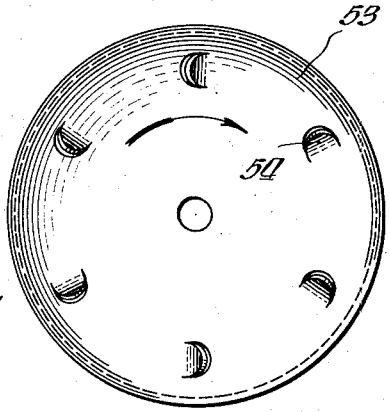
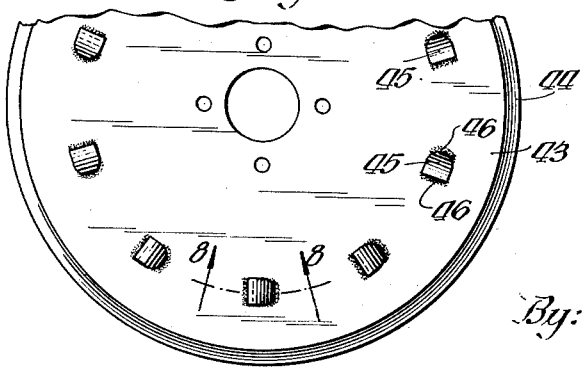

Patented May 13, 1952

2,596,574

UNITED STATES PATENT OFFICE 2,596,574

PLOW COLTER

Oakley D. Lutes, Jackson, Mich.

Application March 3, 1948, Serial No. 12,777

4 Claims. (Cl. 97—209)

The present invention relates to plow colters, and more particularly to an improved type of construction for plow colters to increase the efficiency thereof in cutting or severing trash and debris.

Heretofore numerous attempts have been made in increasing the efficiency of a plow colter, particularly with a view of insuring continuous rotation of the colter while in use. Certain plow colters have been provided with notched or irregular edges so that the soil impinging thereon would insure rotation of the colter. Such notches or edges, however, have the disadvantage of becoming dull, improperly cutting stalks, trash and other debris so that not infrequently this material is carried thru underneath so as to become lodged on leading edge of mouldboard, causing a series accumulation and clogging of the plow.

In still another form ridges arranged radially have been provided adjacent the periphery of the plow colter so as to insure rotation thereof. Where the ground is too sandy or too mucky, even the provision of such ridges has been found inadequate to produce rotation of the colter.

It, therefore, is apparent that still other steps should be taken to improve the slicing and cutting action of the edge of the plow colter. In accordance with the present invention this is accomplished by providing protuberances in the form of a button, a louver or dimple arranged at spaced intervals inwardly from the cutting edge or periphery of the colter. These protuberances in the operation of the colter penetrate the ground and produce a rotation of the plow colter at a rate of speed much higher than in other types of colters thereby increasing the slicing and cutting efficiency of the colter.

It, therefore, is an object of the present invention to provide an improved form of plow colter which will be more effective in cutting trash and debris.

Another object of the present invention is to provide an improved form of plow colter which will have a slicing action at its peripheral edge.

Still another object of the present invention is to provide an improved form of plow colter having means extending above the surface of the colter for driving the colter in a rotary manner at a speed higher than normal for other types of colters.

Still another object of the present invention is to provide means for rototing a plow colter by suitable driving means whereby the peripheral motion of the colter exceeds the usual peripheral motion thereby to produce an improved slicing and cutting action.

Other and further objects of the present invention subsequently will become apparent by reference to the following description taken in conjunction with the accompanying drawings, wherein:

Figure 1 is a sideview showing the relation between a plow and a colter constructed in accordance with the present invention;

Figure 2 is an enlarged sideview of a plow colter illustrated in Figure 1;

Figure 3 is a cross-sectional view through the colter of Figure 2 as seen in the direction of the arrows along the line 3—3;

Figure 4 is a sideview of a colter showing another embodiment of the present invention;

Figure 5 is an edgeview of the colter shown in Figure 4;

Figure 6 is a partial sideview of a colter showing another embodiment of the present invention;

Figure 7 is a partial sideview of a colter showing still another embodiment of the present invention;

Figure 8 is a cross-sectional view through the colter illustrated in Figure 7, as seen in the direction of the arrows along the line 8—8;

Figure 9 is an enlarged view of another form of construction the protuberances on the colter;

Figure 10 is an enlarged view of still another form or manner of constructing the protuberances;

Figure 11 is a side view of another embodiment of the present invention; and

Figure 12 is a cross-sectional view of the embodiment shown in Figure 11.

Referring to Figure 1 of the drawing it will be seen that there has been illustrated a plow comprising a plowshare 21 and a moldboard 22 which is connected to a plowbeam 23. The plowbeam 23 ahead of the plow is provided with a clevis held in position by suitable nuts 24. The clevis holds in position a rod or shaft 25 which in turn is connected to an arm 26. The arm 26 carries a spindle or bearing member 27 about which a plow colter 28 is arranged to rotate.

It will be noted that the plow colter 28 which is also shown in detail in Figure 2 is provided with a plurality of regularly arranged and spaced apart protuberances which are arranged to be inserted into the soil beneath the soil line 29. In the embodiment illustrated in detail in Figures 2 and 3 each of the protuberances which serves as a driving member is formed in the manner of a louver 31 which may be punched out or struck from the body material of the colter 28. It will be noted that each of the protuberances 31 is located inwardly from the periphery or cutting edge 32 so that the driving member 31 will produce a rotation of the plow colter so as to move the peripheral edge 32 at a relatively high speed. It will be noted that each protuberance or louver 31 has a surface 33 inclined toward the body surface of the plow colter 28. This inclined surface is directed in the direction of the rotation of the plow colter as indicated by the arrow in Figure 2. This facilitates the insertion of the protuberance into the soil beneath the soil line 29. The member 31, after having been inserted into the soil produces a rotation of the plow colter so that the peripheral edge 32 moves at a higher speed than would the plow colter move if no protuberances or members 31 were provided. This increased speed of the peripheral cutting edge 32 therefore causes the plow colter to produce a slicing or cutting action of much greater efficiency so as to insure the severance of stalks, trash and debris which may be on the surface of the soil. With the severance of this material the plow comprising the plowshare 21 and the moldboard 22 then can be more effective in turning over the soil so as to cover all stalks and debris. Other colters depend on simply forcing trash down against the soil to slowly shear it, rather than use a slicing action.

For certain types of soil such as the instance where the soil is very sandy or in the case where the soil is mucky and loose, it may be desirable to employ a construction such as that illustrated in Figure 4 wherefrom it will be seen that driving members have been provided on both sides of the plow colter so as to provide a still greater driving engagement with the soil.

From Figures 4 and 5 it will be seen that the plow colter 34 has a peripheral cutting edge 35 and that alternate louvers 36 and 37 project to the right and left of the colter 35. Thus on each side of the plow colter driving members are provided. In each instance each driving member is so arranged as to point in the direction of rotation so that the driving member will readily enter the ground with a minimum of resistance. The driving member after it is in the ground, however, grips the ground so as to produce rotation of the plow colter thereby to increase the speed of travel of the cutting edge 35. Speed is gained thru the fact that the louvers are on a lesser radius than the periphery of the colter.

Still another embodiment of the invention is illustrated in Figure 6 wherein there has been illustrated a plow colter 38 having a peripheral cutting edge 39. In this embodiment one series of protuberances 41 is located at a certain radius from the center of the plow colter 38 and another set of protuberances 42 is located at a still greater or lesser radius from the center of the plow colter. These may be arranged in staggered relation as illustrated or in any other desired relationship. The provision of two sets or of a plurality of different driving members such as 41 and 42 at different radii may be particularly useful when different conditions of operation of the plow colter necessitate different depths of adjusting the plow colter relative to the soil line. From the arrangement shown in Figure 6 it becomes apparent that in the present invention it is not limited to a particular distance from the center as to where the driving members are to be located. The only provision necessary is that the driving members be located inwardly away from the cutting edge such as the cutting edge 39 of Figure 6 so that the cutting edge 39 will be moved at a greater rate than would be the case if no driving members were provided for the plow colter. It furthermore becomes apparent that not all of the driving members need be located at the same radius from the center of the plow colter.

While the previous embodiments shown in Figures 1-6 have illustrated the driving members or protuberances as being formed by a punching operation whereby a portion of the metal of the plow colter is bent outwardly, it of course will be apparent that other forms of driving members may be employed. This is illustrated by Figure 7 where additional metal is employed to provide the driving members. In the arrangement shown in Figure 7 the plow colter 43 has a cutting edge 44. Suitable lugs 45 are secured to the body of the plow colter 43 by means such as welding as at 46. Each of the lugs again as is apparent from Figure 8 is preferably arranged so that an inclined surface 47 is provided so as to facilitate the insertion of the driving members beneath the soil line. It furthermore will be appreciated that the lugs 45 need not necessarily be of the shape illustrated and subsequently will become apparent.

From Figures 9 and 10 it will be apparent that different shapes may be employed since Figure 9 shows a pointed or star-like configuration where a struck out member 48 forms integrally with the body 49 of a plow colter. In a similar manner from the main body portion 51 of a plow colter shown in Figure 10 there has been struck outwardly a generally trapezoidal louver member 52. In both cases the protruding portions of the members 48 and 52 serve as the driving members for producing increased speed of rotation of the plow colter.

From Figures 11 and 12 it will be seen that the principles of the present invention likewise may be applied to colters of any suitable shape such as the concave-convex colter 53 shown in Figures 11 and 12. From this figure it will be noted that inwardly struck louver-like lugs or driving members 54 are provided at a distance inwardly from the outer periphery or cutting edge of the colter. It furthermore will be appreciated that the angle between the surface of the protuberance or louver may be varied to suit particular conditions and furthermore, that the number of protuberances or louvers employed may be varied accordingly. From Figures 11 and 12 it furthermore is apparent that the present invention is applicable to all types of colter blades and discs whether they are concavalconvex, flat or dish-shaped discs having flat bottoms or an other variations thereof.

While for the purpose of describing and illustrating the present invention, certain embodiments have been shown in the drawings, it is to be understood that the invention is not to be limited thereby since such further variations and modifications of the invention are contemplated as may be commensurate with the spirit and scope of the following claims.

What I desire to protect by United States Letters Patent is claimed as follows:

1. A plow colter comprising a generally circular metal member provided with a plurality of regularly spaced shallow driving surfaces located at a predetermined distance inwardly from the periphery of said member, each driving surface being inclined toward the surface of said member in the direction of rotation thereof to facilitate penetration of the soil, said driving surfaces operating to rotate said colter periphery at a speed higher than that which would obtain without said driving surfaces.

2. A slicing plow-colter comprising a metal colter disc provided with a plurality of shallow driving protuberances on at least one surface thereof and arranged in spaced angular relation a predetermined distance inwardly from the periphery of said disc to penetrate in succession beneath the soil line when said colter is in use, each protuberance being formed of the body metal of said disc and having a surface inclined to the surface of said colter in the direction of rotation of said colter.

3. A plow colter comprising a metal colter disc provided with a plurality of regularly spaced driving surfaces protruding a short distance above the surface of the body of the disc and located at a predetermined distance inwardly from the periphery thereof, each driving surface having a portion inclined toward the surface of said disc in the direction of rotation thereof to facilitate penetration of the soil, said driving surfaces operating to rotate said colter periphery at a speed higher than that which would obtain without said driving surfaces.

4. A plow colter comprising a disc having a plurality of angularly arranged driving protuberances extending a short distance above the surface of said disc and being located at a radius less than the radius of said disc, said protuberances being arranged to penetrate in succession beneath the soil line to produce rotation of said disc and a high speed of travel of the periphery thereof whereby the colter edge cuts with a slicing action.

OAKLEY D. LUTES.

REFERENCES CITED

The following references are of record in the file of this patent:

UNITED STATES PATENTS

| Number | Name | Date |
|---|---|---|
| 994,707 | Meissner | June 6, 1911 |
| 1,186,880 | Canda | June 13, 1916 |
| 2,036,820 | Murdock | Apr. 7, 1936 |
| 2,084,055 | Cascadden | June 15, 1937 |
| 2,403,209 | Boumphrey | July 2, 1946 |